INVENTOR
HERBERT C. BRAUCHLA
BY Semmes & Semmes
ATTORNEYS

April 25, 1967          H. C. BRAUCHLA          3,315,804
APPARATUS FOR RIFFLE SCREEN SIZING Filed Oct. 7, 1965          5 Sheets-Sheet 4

INVENTOR
HERBERT C. BRAUCHLA

BY Semmes & Semmes

ATTORNEYS

April 25, 1967     H. C. BRAUCHLA     3,315,804
APPARATUS FOR RIFFLE SCREEN SIZING
Filed Oct. 7, 1965     5 Sheets-Sheet 5

INVENTOR
HERBERT C. BRAUCHLA
BY Semmes & Semmes
ATTORNEYS

United States Patent Office 3,315,804
Patented Apr. 25, 1967

3,315,804
APPARATUS FOR RIFFLE SCREEN SIZING
Herbert C. Brauchla, P.O. Box 349, Oak Harbor Road,
Fremont, Ohio 43420
Filed Oct. 7, 1965, Ser. No. 493,643
3 Claims. (Cl. 209—44)

The present application relates to apparatus for sizing of materials, particularly apparauts for riffle screen sizing for separating material components according to their precise size rather than their specific gravity.

Earlier inventors have adopted numerous types of combs, riffles and screen elements for sizing of granular materials. A particular shortcoming of screens has been blinding of the screens due to the forcing of oversized components between the interstices of the woven screen wire. These inventors have employed ball and rod beaters, flushing systems and the like to avoid blinding. In the case of combs used for sizing, a limitation has resulted from distortion of the combs by the weight of the aggregate mass being advanced, as well as the limited capability of comb systems for precise sizing of the fines. In general screen systems have been used where the fines were desired to be separated and comb systems have been used where the oversize was desired.

Accordingly, applicant has developed a riffle screen which eliminates blinding and has an exceptionally precise capability of recovering fines. In applicant's apparatus one or more wire screens or perforated metal sheets are supported as an inclined riffle bed, having a series of transversely extending riffles. Matter to be sized is advanced over this riffle bed which is vibrated, and the individual riffles are simultaneously beaten interiorly so as to eliminate blinding. The individual riffles are secured to each other so as to present an effectively rigid bed.

Accordingly, it is an object of the invention to provide an improved riffle screen which eliminates blinding.

Another object of the invention is to provide apparatus for obtaining accurately sized fines.

Additional objects of the invention will become apparent from the ensuing specification and attached drawings, wherein.

Figure 8:
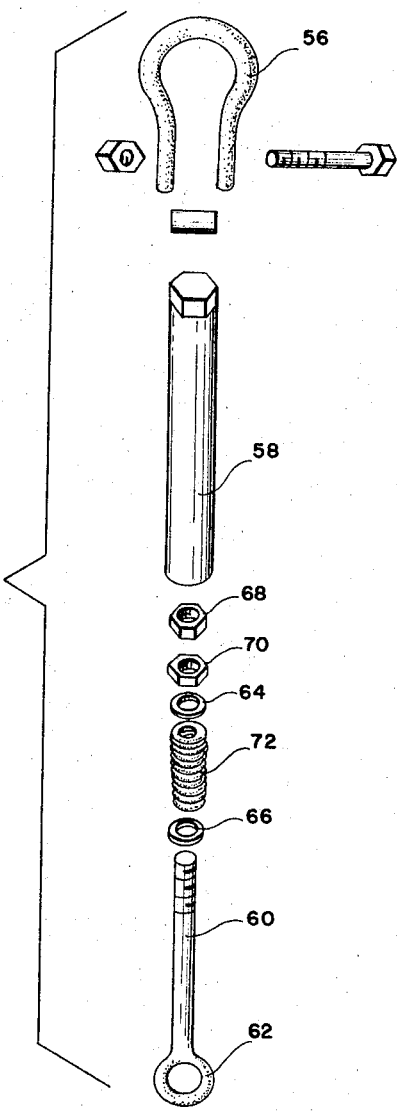
Figure 9:
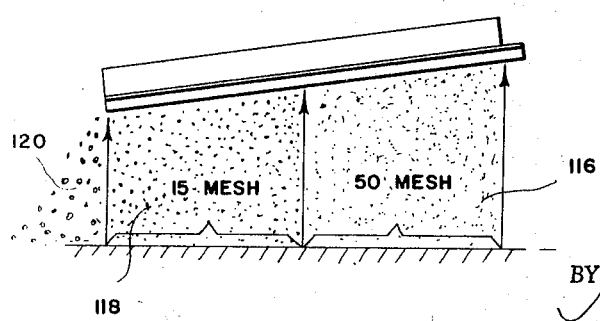

FIG. 8 is an exploded perspective showing the resilient support coupling for the riffle frame; and FIG. 9 is a schematic view of a riffle bed 90, wherein the top of the inclined portion employs 60 mesh screens and the bottom employs 15 mesh screens for recovery of differently sized fines.

Figure 1:
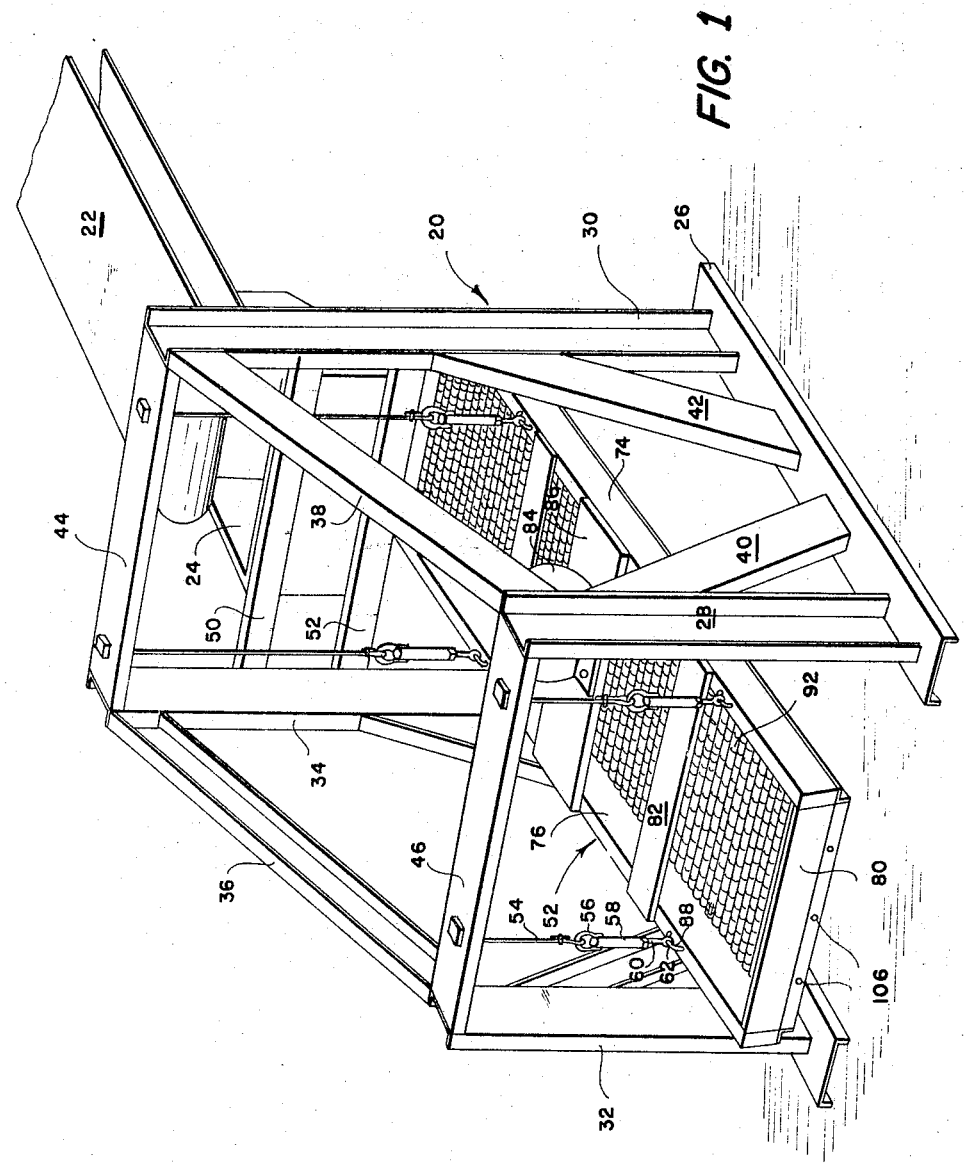
FIG. 1 is a perspective view of a riffle screen 90 resiliently supported in a rigid frame.

In FIG. 1 a riffle screen sizing device 20 is illustrated as being comprised of base 20, supporting upstanding legs 28, 30, 32 and 34, in turn rigidized by angular trusses 40, 42, 36 and 38 and the like. Material to be sized may be fed upon endless belt 22 into hopper 24 supported on the device by means of cross pieces 50 and 52.

Figure 3:
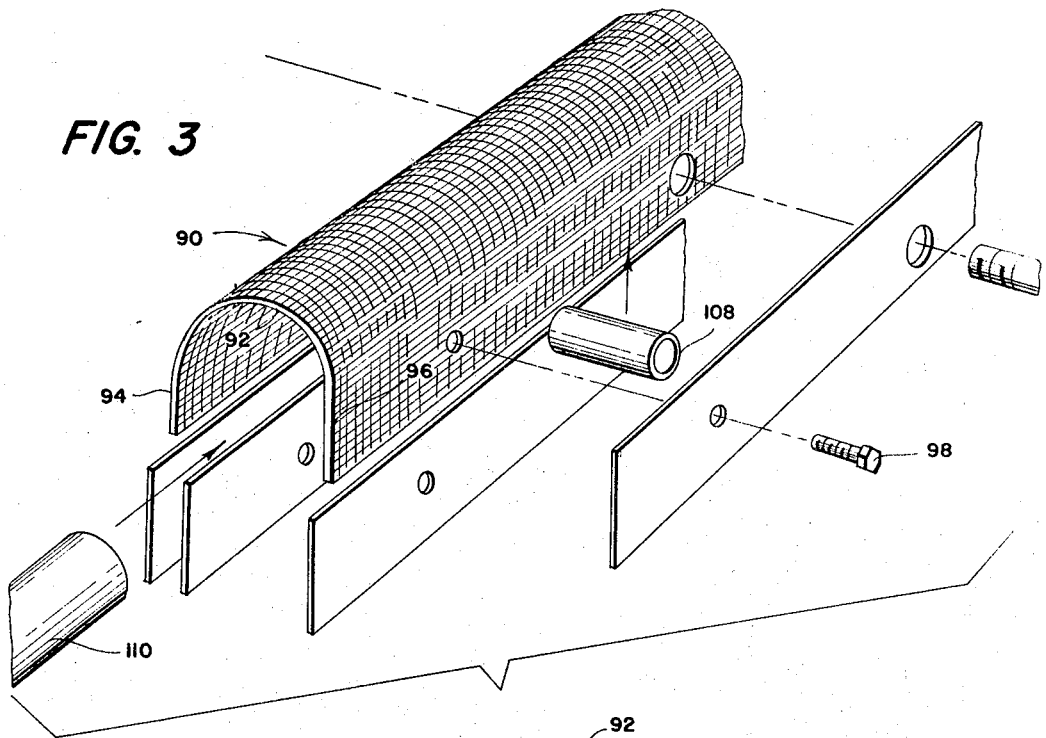
FIG. 3 is an enlarged, exploded fragmentary view, showing the individual riffle screen of arcuate, inverted U-shape, together with supporting elements.
Figure 4:
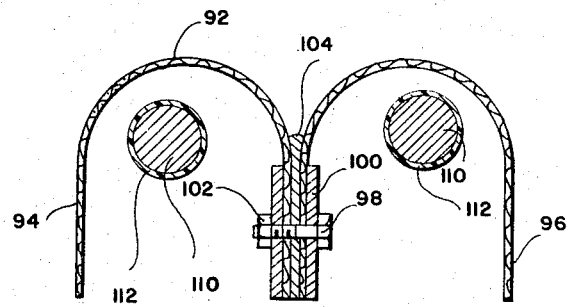
FIG. 4 is a vertical sectional view taken along section line 4—4 of FIG. 3 showing the positioning of the transverse agitator rods 110 between the upstanding sides of each riffle element.

As illustrated in FIG. 3 screen riffle 90 is comprised of a series of individual screen elements of an inverted U-shape having an arcuate top portion 92 and vertically disposed parallel sides 94 and 96. Perforated metal sheets may be substituted for the woven wire screen elements. Generally, perforated metal provides a more rigid sizing surface, however, there are fewer sizing apertures per square inch. Individual riffle screen elements are positioned in a frame comprised of side pieces 74 and 76 and end pieces 78 and 80. The riffle screen vertical sides 94 and 96 are secured one to the other by series of vertical plates 100 and stove bolts 98 which extend through holes in the sides and are secured by means of nut 102, as illustrated in FIG. 4. Epoxy 104 may be employed betwen the upstanding sides so as to permeate the abutting screen sides 94, 96 and rigidly seal one to the other. This seal comprised of epoxy and plates 100 prevents material from becoming clogged or blinded between the individual riffle screens.

As illustrated in FIGS. 3 and 4, individual riffle elements 90 are additionally rigidized by means of three or more longitudinally extending support bar 106. Support bar 106 is further illustrated in FIG. 5 where a plurality of cylindrical spacers 108 of larger sized diameter are positioned about bar 106 to maintain spacing between individual screen element sides 94 and 96. The ends of the support bars 106 are secured in frame end pieces 78 and 80. The frame is additionally rigidized by means of top cross pieces 82 and 86. A vibratory motor 84 may be supported on piece 86. The entire frame is suspended resiliently from the frame top pieces 44 and 46 by means of cable 54 extending through clevis 56 which in turn is supported within shock absorbing body 58. As illustrated in FIG. 8 body 58 has a resilient coupling consisting of eyebolt 60 having eye 62 secured in compression spring 72 and body 58 by means of washer elements 64, 66 and threaded nuts 68 and 70.

Figure 6:
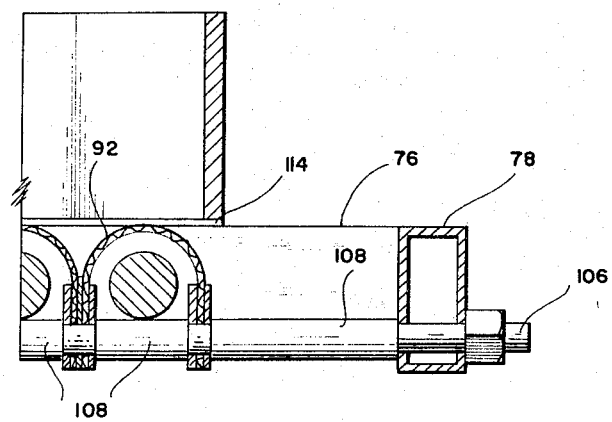
FIG. 6 is a vertical sectional fragment, showing a positioning of longitudinal support bars 106 running through the bottom of the riffle sides.
Figure 7:
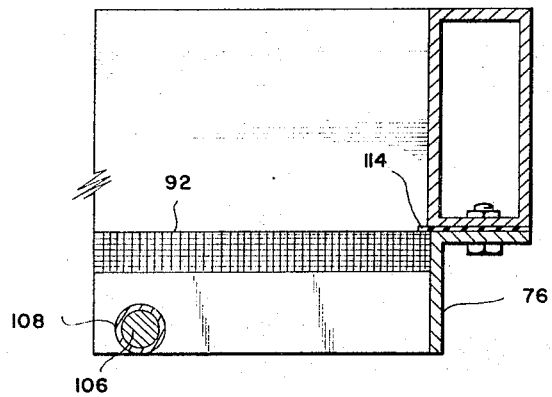
FIG. 7 is an end section in fragment showing the resilient positioning of the individual riffles 90 within the screen.

As illustrated in FIGS. 6 and 7 a rubber strip 114 may be employed intermediate the frame sides 76, 74 and the tops 92 of the riffle elements so as to absorb vibrations induced by motor 84.

Figure 5:
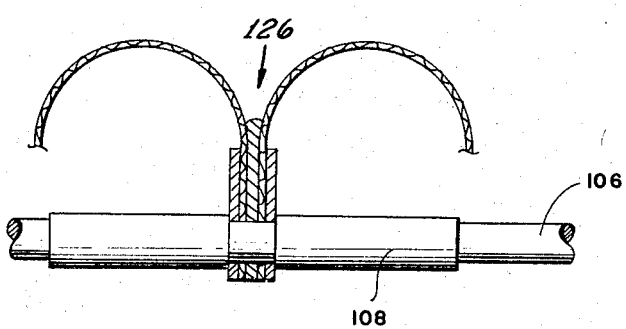
FIG. 5 is a similar vertical sectional view showing support bar 106 and surrounding cylindrical spacers 108.

As illustrated in FIGS. 4 and 5, within each riffle element 90 there is loosely supported by means of spacer bars 106 agitating rod 110. These rods may be coated with vinyl 112 so as to reduce the abrading effect of the rods upon the inside of the screen riffle.

In one adaptation of the device vibrator 84 was developing 1400 r.p.m. with the result that each of the agitator bars 110 was knocking the interior of the riffle, at random as illustrated in FIG. 5. This random knocking or beating immediately clears the individual riffle elements so as to virtually eliminate blinding of the material to be sized. As a result extremely finely sized material may be obtained accurately. In this adaptation the individual riffle elements then had a ¾" bend on a 1" radius.

Figure 2:
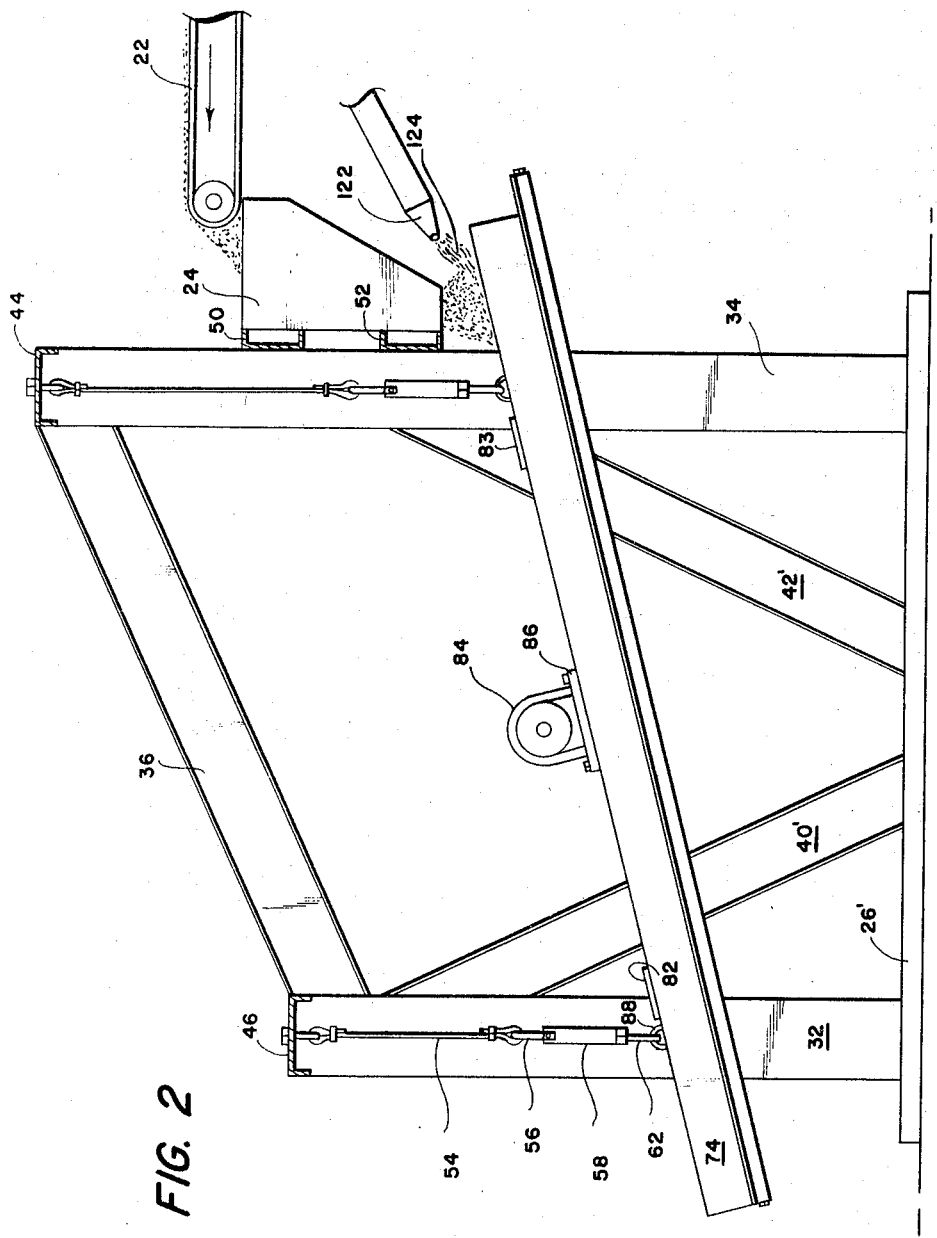
FIG. 2 is a side elevation.

As is well known in sizing, the fines work to the bottom, displacing the oversized material. Consequently, in the present device the fines work to the intersections 126 between the riffle elements and above the epoxy seal 104. These fines then because of the rocking motion work through the individual screen tops 92 while displacing the oversized material downwardly along the riffle for discharge at its end. Oversized matter thus falls rapidly down the screen, while the undersized walks slowly from riffle top 92 to riffle top. In the modification illustrated schematically in FIG. 9, 50 mesh screen riffles are employed at the top of the inclined riffle board whereas 15 mesh screens may be employed at the bottom so as to develop 50 mesh, 15 mesh and at the discharge end a larger sized particle. It is found that increasing the vibration does not thoroughly enhance sizing action for an ineffective resonance can be set out in the agitating bars 110 which will then beat the riffles in unison. By employing arcuately shaped screen riffles 57% more screening area can be provided than in conventional flat screens with the result that a smaller riffle can have greater capacity. Also, the arcuate disposition of the riffle screen enhances the ability of the particles to penetrate through the screens. Inasmuch as the individual riffle elements are sealed one to the other there is no longitudinal spacing between riffle elements. Also, as far as the amplitude of the vibration is concerned, it is desirable to maintain vibration so that the materials to be sized are not bounced or shaken farther than 1" away from the riffle screen tops 92. In the modification shown in FIG. 2 a nozzle 122 can discharge a liquid stream 124 upon the material being sized quite effectively. The water does not interfere with the sizing action and may be used to avoid dust and wash while advancing the matter being sized.

Manifestly, the arcuate disposition of riffle elements 90 may be varied, various types of frames may be employed for suspending the riffle board and various interior vibrating inducing mechanisms may be employed without departing from the spirit and scope of the invention.

I claim:
1. A riffle screen for sizing comprising:
   (A) a frame, resiliently attached to supporting structure;
   (B) transversely extending, abutting riffle screen elements mounted in said frame, so as to form a sizing bed, each of said riffle screen elements being bent so as to have an arcuate top and vertically aligned opposed sides and an open bottom, seal means between abutting sides of adjacent riffle screen elements and at least one longitudinal supporting rod extending beneath said sides;
   (C) vibration means connected to said frame;
   (D) a transverse vibrating rod loosely supported on said longitudinal supporting rod within each of said riffle elements so as to beat the screen from below; and
   (E) means rigidly securing said riffle screen elements and said seal means one to another in side by side relationship.
2. A riffle screen as in claim 1, wherein each of said vibrating rods is covered with a soft, insulated material.
3. A riffle screen as in claim 1, wherein said screen is comprised of perforated metal.

References Cited by the Examiner

UNITED STATES PATENTS

| 183,715 | 10/1876 | Slagle | 209—382 X |
| 1,322,469 | 11/1919 | Ross | 209—311 X |
| 1,391,026 | 9/1921 | Walling | 209—44 X |

FOREIGN PATENTS

| 2,385 | 6/1876 | Great Britain. |

FRANK W. LUTTER, *Primary Examiner.*

HARRY B. THORNTON, *Examiner.*

R. HALPER, *Assistant Examiner.*